United States Patent

[11] 3,608,749

| [72] | Inventor | Howard A. Zollinger |
| | | Williamsville, N.Y. |
| [21] | Appl. No. | 889,507 |
| [22] | Filed | Dec. 31, 1969 |
| [45] | Patented | Sept. 28, 1971 |
| [73] | Assignee | Westinghouse Electric Corporation |
| | | Pittsburgh, Pa. |

[54] PLURAL DEPTH STORAGE SYSTEM WITH A PLURALITY OF ARTICLE HANDLING MEANS
5 Claims, 8 Drawing Figs.

[52] U.S. Cl. .................................................... 214/16.4 A,
 214/730
[51] Int. Cl. .................................................... B65g 1/06,
 B60p 1/44
[50] Field of Search .......................................... 214/16.4,
 16.42, 75, 730, 16.14 C

[56] References Cited
UNITED STATES PATENTS

| 2,815,133 | 12/1957 | Asheim et al. | 214/16.1 R |
| 2,951,599 | 9/1960 | Bogar | 214/16.1 R |
| 3,416,685 | 12/1968 | Alimanestianu | 214/730 |

FOREIGN PATENTS

| 1,229,454 | 11/1966 | Germany | 214/16.4 A |
| 1,910,603 | 3/1969 | Germany | 214/750 |
| 1,059,096 | 2/1967 | Great Britain | 214/16.4 A |
| 1,175,652 | 12/1969 | Great Britain | 214/16.4 A |

*Primary Examiner*—Gerald M. Forlenza
*Assistant Examiner*—Raymond B. Johnson
*Attorneys*—F. H. Henson, R. G. Brodahl and C. J. Paznokas ABSTRACT: Described is a high bay storage warehousing system of the type wherein storage rack modules comprising superimposed storage racks are disposed on either side of an aisle. Articles to be stored in the racks are carried to and from a loading area at one end of the aisle by means of a stacker crane which runs on overhead rails. The loads are stored two deep on either side of the aisle, while a unique stacker crane is provided capable of reaching twice the width of a load to retrieve a load in the back of a rack. Also described is a novel method for warehousing utilizing a high bay storage system of the type described above wherein loads are stored one behind the other in each rack of a storage module.

PLURAL DEPTH STORAGE SYSTEM WITH A PLURALITY OF ARTICLE HANDLING MEANS

BACKGROUND OF THE INVENTION

High bay storage systems of the type wherein loads are stored in stacked racks have, in the past, been commonly serviced by fork lift trucks. That is, the loads, mounted on pallets, were moved into or out of the racks by means of a fork lift truck. This type of system, however, requires a relatively wide aisle between stacked rack modules to manipulate the fork lift truck; and in systems where loads are stacked two or three deep in each rack, it is necessary for the fork lift truck to move one or two loads in the front in order to get at a load in the back. Needles to say, this is an inefficient system for a warehouse having a large variety of products which must be stored in inventory.

In an effort to overcome the disadvantages of the fork lift truck system, high bay storage warehousing systems utilizing stacker cranes and racks have been devised to help utilize the cube of a building and minimize the required floor space. The typical high bay storage system provides an aisle space slightly wider than the load and a storage rack on each side of the open aisle slightly larger than the width of the load. This means that each aisle of storage can be represented by three times the load width or depth plus some clearances to allow for diagonal bracing, sprinkler systems and passage of a traveling load in the aisle. If the storage capability of an aisle is two loads and the total space required is slightly larger than three loads, approximately a 60 percent utilization of floor space results. This is a great improvement over systems employing fork lift trucks where, because of the necessary width of the aisles required for manipulation of the trucks, only about 40 percent to 45 percent of the available floor space can be utilized for actual storage.

SUMMARY OF THE INVENTION

As an overall object the present invention provides a high bay storage system of the type described above wherein loads can be stacked two deep on either side of an aisle along which a stacker crane moves on overhead or floor mounted tracks and provides approximately 75 percent to 80 percent utilization of floor space.

Another object of the invention is to provide a unique stacker crane for a high bay storage system of the type described above wherein loads can be removed from the back of a storage bin containing two loads with a minimum of handling and time expenditure.

Still another object of the invention is to provide a method for warehousing wherein loads can be stored one behind the other in each rack of a high bay storage module either side of an aisle which is only slightly wider than the loads to be stored.

In accordance with the invention, a high bay storage system is provided wherein the storage racks on either side of an aisle are each capable of handling two loads, one behind the other. In this manner, essentially 75 percent of the available floor space of a warehouse can be used for actual storage. A stacker crane is provided which moves on overhead or floor mounted rail and is provided with a reciprocable platform which carries: (1) forks which can reciprocate parallel to the length of the aisle, and (2) telescoping shuttle forks which can move outwardly and under a pallet either in the front or back of a storage rack on either side of the aisle. If it is assumed, for example, that a load in the back of a rack is to be removed, the shuttle forks move outwardly and under the pallet for the first load and bring it back to the stacker crane platform. Thereafter, the reciprocable forks on the stacker crane platform move under the pallet, elevate it, and move it backwardly away from the shuttle forks. The shuttle forks are actuated to move back into the storage rack while the reciprocable forks are retracting and under the pallet containing the second load, whereupon the shuttle forks are retracted to bring the second load back to the stacker crane platform. The stacker crane is then moved to an unloading station where the second load is removed from the shuttle forks; and the stacker crane deposits the first load back in its original rack or another rack by transferring it from the reciprocable forks on the platform to the shuttle forks which, in turn, reinsert it into a rack. The stacker crane is then available for other loads. Alternatively, when the stacker crane platform comes to the loading and unloading station and the second load removed from the shuttle forks, a third load can be picked-up on the shuttle forks and deposited in a storage rack prior to reinsertion of the first load stored on the platform racks.

The above and other objects and features of the invention will become apparent from the following detailed description taken in connection with the accompanying drawings which form a part of this specification, and in which.

Figure 1:
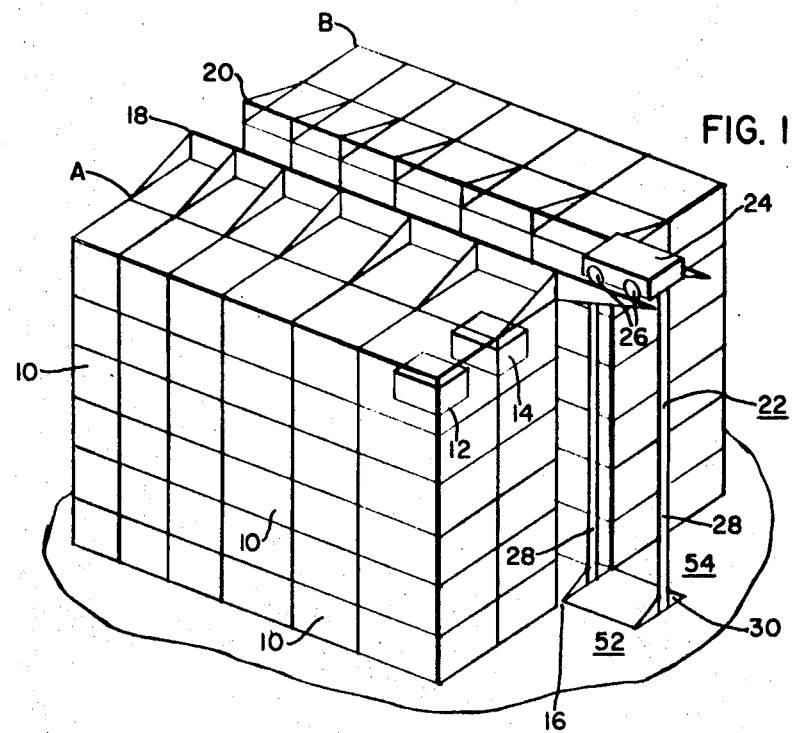
FIG. 1 is a schematic perspective view of a high bay storage system.

With reference now to the drawings, and particularly to FIG. 1, the high bay storage system shown comprises a pair of high bay storage modules A and B each comprising a honeycomb of storage racks 10 stacked one upon the other with each rack being adapted to handle two loads 12 and 14, one behind the other. The two high bay modules A and B are separated by means of an aisle 16, the width of the aisle being slightly greater than the maximum width of a load to be stored in one of the racks 10.

Supported above the modules A and B are tracks 18 and 20 on which a stacker crane 22 can run. As shown, the stacker crane 22 includes an upper carriage 24 mounted on wheels 26 which traverse the tracks 18 and 20, together with downwardly depending guideways 28 which carry, for a vertical reciprocating movement, a platform 30. Suitable drive motor means, not shown, are provided to cause the carriage 24 to traverse the tracks 18 and 20, and also to cause the platform 30 to elevate or descend on the guideways 28.

Figure 2:
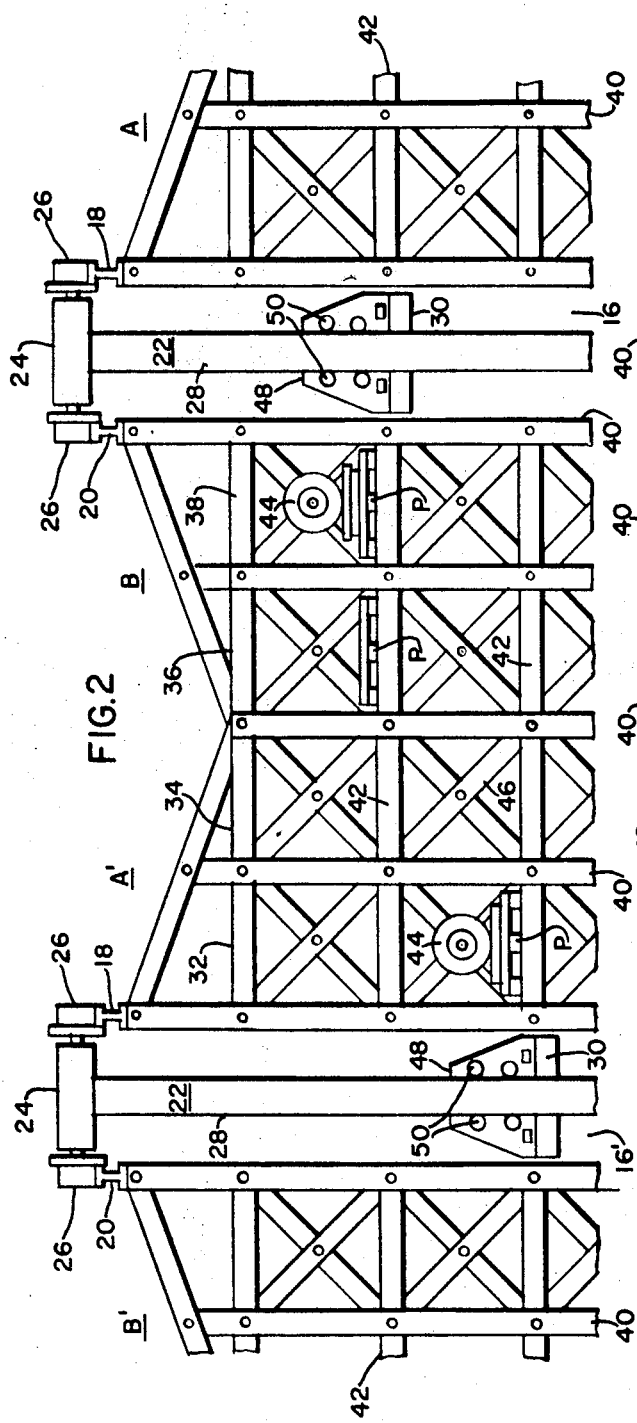
FIG. 2 is a detailed end view of the high bay storage system of FIG. 1.
Figure 5:
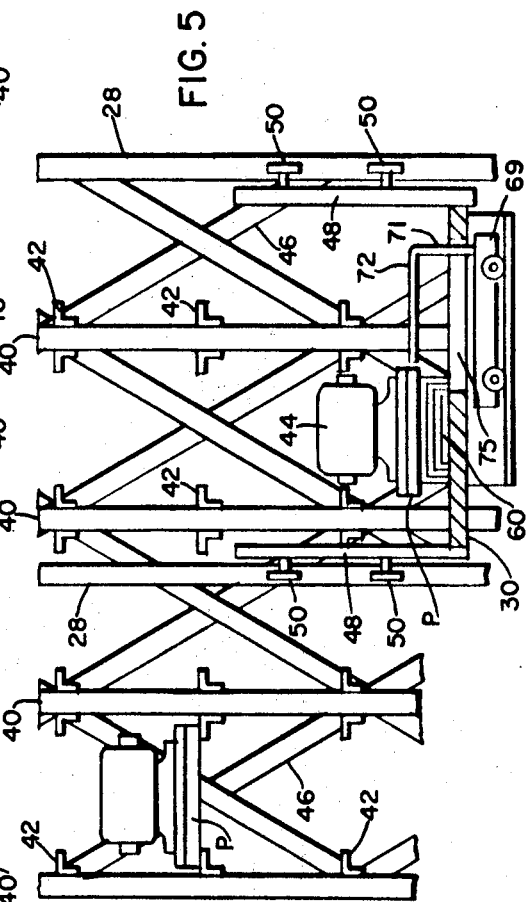
FIG. 5 is a side view of the stacker crane platform and associated elements of the storage system of the present invention.

With reference to FIG. 2, two modules A and B are separated by an aisle 16, and a second pair of modules A' and B' is separated by an aisle 16', the backs of the modules B and A' being in abutting relationship to provide four adjacent columns of storage racks 32, 34, 36 and 38. As best shown in FIG. 5, each of the individual storage racks is formed between upright structural members 40 to which horizontally extending angle irons 42 are secured, thereby forming guideways or tracks upon which pallets P may be deposited. Thus, each storage rack 10 is formed by four upright columns 40 and two horizontally extending angle irons 42 on which the pallets P rest. In the embodiment shown, the loads for the pallets P, by way of example, comprise electric motors 44. Suitable cross bracing 46 may be utilized to give the structure sufficient strength, depending upon its height, the weight of the loads, and other factors.

As shown in FIGS. 2 and 5, the platform 30 is provided with upright members 48 at its opposite ends having rollers 50 which engage the vertical guideways 28. In the operation of the system, which will be explained more in detail hereinafter, a stacker crane 22 is caused to traverse the rails 18 and 20 while the platform 30 is caused to move upwardly or downwardly until the platform 30 reaches the level of the guideways formed by the angle irons 42 for a particular storage rack 10. At this point, shuttle forks, hereinafter described, are caused to extend under a pallet positioned on the angle irons 42; and the shuttle forks are raised and retracted whereby the pallet and its load are brought back onto the platform 30. At this point, the load may be transferred to a dropoff or unloading station, generally indicated by the reference numeral 52 in FIGS. 1 and 3. A new pallet and load may then be inserted onto the platform 30 from a loading station, generally indicated by the reference numeral 54 in FIGS. 1 and 3.

Figure 3:
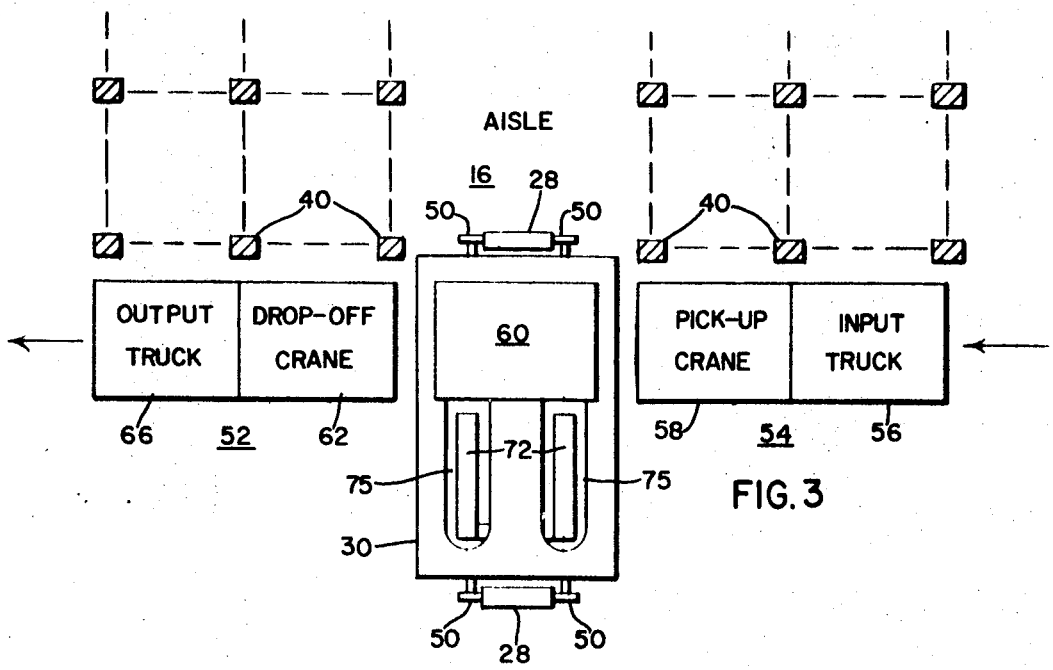
FIG. 3 is a plan view of the pickup and dropoff area for the high bay storage system of FIG. 1.

The loading and unloading positions are shown in greater detail in FIG. 3. At the loading station 54, a device, fork truck, or conveyor places a load in the input truck position 56. A conveyorized buffer, not shown, then moves the load from the input truck position 56 to the crane pickup position 58 and in doing so, squares the load for positive positioning. The load may be on or in a suitable device for bearing a load, such as a pallet, crate, box, container, or other device, for example the pallet shown. At This point, shuttle forks, schematically indicated as a rectangle 60 on the crane platform 30, extend out underneath the pallet, pick it up, and bring the pallet and load back onto the platform 30. From this position, the crane 22 travels down the aisle 16, simultaneously hoisting the platform 30 and traveling along tracks 18 and 20 to the desired location for storage. When a loaded pallet is to be removed from the platform 30, the shuttle forks 60 are extended to the left as viewed in FIG. 3 to deposit the load at a dropoff crane area 62. From here, it is conveyed by a conveyor or otherwise to an output fork lift truck position 66.

Figure 4:
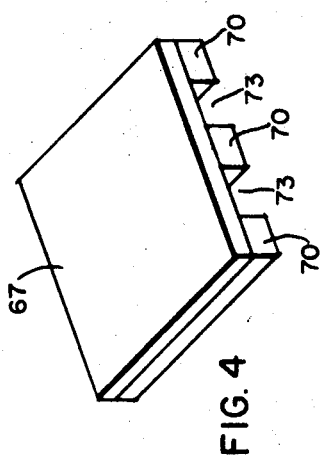
FIG. 4 is a perspective view of a type of pallet which may be used for loads in the high bay storage system of the invention.

One type of suitable pallet which may be utilized for the storage system of the invention is shown in FIG. 4. It comprises an upper platform 67 having two or three elongated beams 70 extending underneath and secured thereto. The beams 70 are separated such that the forks of a fork lift truck, for example, can enter spaces 73 and lift the pallet with a load thereon, even when the lower surfaces of the beams 70 are resting on the ground or connected by lower facing boards.

The details of the platform mechanism are perhaps best shown in FIGS. 5–8. Note, in FIG. 5, that the forks 72 are connected at their trailing ends to upright members 71 which travel on a carriage 69 reciprocable on tracks attached to and carried beneath the platform 30. The upright members 71 pass through slots 75 in the platform 30; while means, not shown, are provided for elevating the forks after they enter the spaces 73 of a pallet, whereby the pallet can be elevated off the shuttle forks 60 and retracted. By virtue of the fact that the reciprocating carriage 69 is beneath the platform, rather than above the platform and behind the forks 72, the length of the platform 30 need be only slightly more than twice the width of a pallet. A similar result can be achieved with the use of a scissors-type actuating mechanism for reciprocating the forks 72 back and forth.

Figure 6:
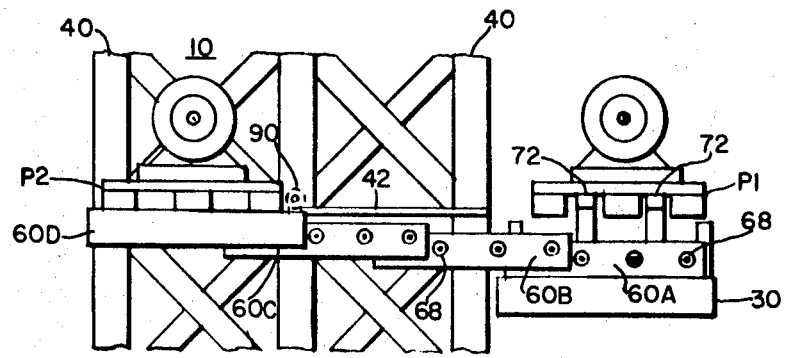
FIG. 6 is an end view of the apparatus shown in FIG. 5.
Figure 7:
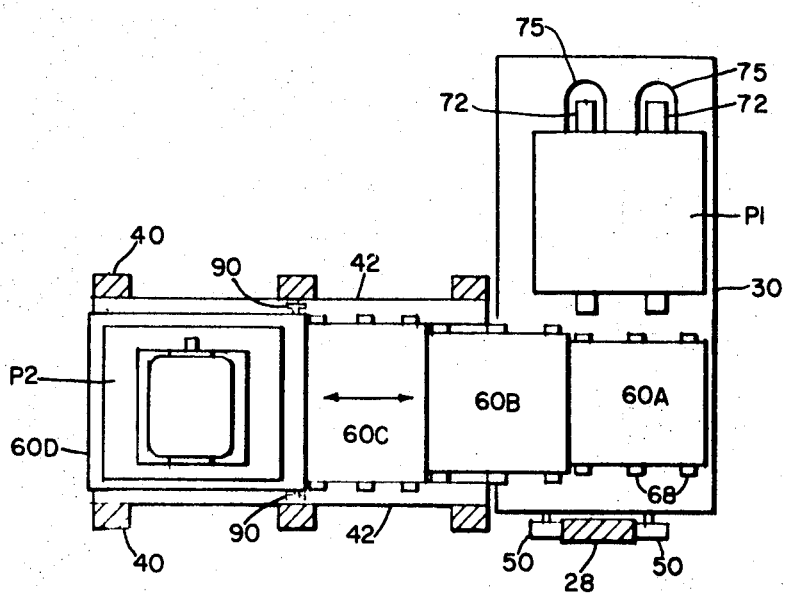
FIG. 7 is a top view of the apparatus shown in FIG. 6.

The shuttle forks 60 (FIGS. 6 and 7) comprise four U-shaped members 60A, 60B, 60C and 60D having rollers 68 which permit them to move outwardly in telescoping fashion. The rollers 68, for example, may fit into guideways or slots on the downwardly depending skirts of each member. In FIG. 6, the outermost member 60D is shown extending under a pallet P stored in the rack 10 behind the space immediately adjacent the aisle 16. However, by causing the members 60A–60D to extend a lesser distance, the member 60D can be caused to stop beneath a pallet in the rack immediately adjacent the aisle 16.

Assuming that the member 60D has moved under the pallet P1, it is elevated as by means of elevation of the platform 30. The telescoping members are then retracted whereby the pallet P1 and its load are moved back onto the platform 30. At this point, the forks 72 can be caused to move through slots 73 of the pallet, lift the pallet, and retract it into the position shown in FIG. 7. A second pallet P2 can then be retracted by means of the members 60A–60D and stored on the platform 30 ahead of the previous pallet P1 which is stored on the forks 72.

Figure 8:
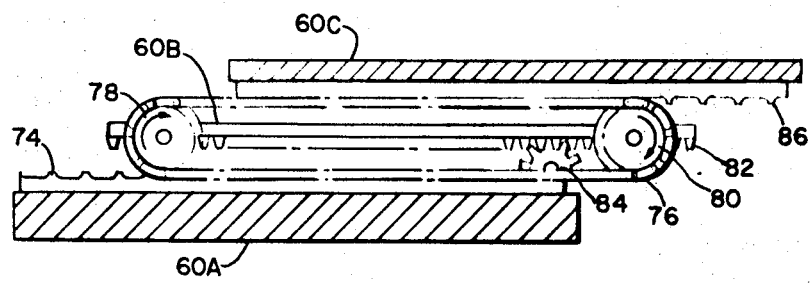
FIG. 8 is a schematic illustration of one type of drive which may be utilized to actuate the shuttle forks shown in FIGS. 5–7.

One type of mechanism for actuating the members 60A–60D is shown in FIG. 8. The member 60A is provided with a rack 74 which meshes with a roller chain 76. The roller chain 76, in turn, passes around sprockets 78 and 80 carried on the second member 60B. Member 60B is also provided with a rack 82 which meshes with a pinion gear 84 driven by means of a motor, not shown, mounted on the platform 30, or member 60A which is stationary. The member 60C is provided with a rack 86 which meshes with the upper reach of the roller chain 76.

Upon rotation of the gear 84 in a clockwise direction, for example, the member 60B will be caused to move to the right. At the same time, the roller chain 76 will be caused to rotate about sprockets 78, thereby advancing the third member 60C. A similar arrangement for advancing the fourth member 60D can be provided by means of a sprocket and roller chain arrangement connected between it and the second member 60B. Note that all of the members 60A–60D move at the same time rather than in sequence. That is, as soon as member 60B moves outwardly, member 60C is also caused to move outwardly, and so on. In order to move the members 60A–60D to the left rather than the right as shown in FIG. 8, a second pinion gear, not shown, may be provided at the left side of the member 60A to engage the rack 82 on member 60B. In this latter case, the pinion gear will rotate in a counterclockwise direction in order to cause the members 60A–60D to expand outwardly to the left. Of course, in order to retract the members, it is necessary only to reverse the direction of the pinion gear which meshes with rack 82.

As an example of the operation of the system, let us assume that a load has just been deposited at position 56 in FIG. 3. It is conveyed by a conveyorized buffer to the pickup crane position 58 which it is squared for positive positioning. At this point, the shuttle forks 60 moved to the right as viewed in FIG. 3 and underneath a pallet P, elevate the pallet and retract whereby the pallet is now positioned over the shuttle forks 60 on the platform 30. In this position, the stacker crane 22 moves down the aisle 16 while the platform 30 is simultaneously elevated.

When the stacker crane 22 is stopped at the correct shelf level and column position, the shuttle forks 60 can extend either to the right or to the left to put the load in the front rack if there is already one in the rear, or put the load in the back of that particular opening. While the crane is in the aisle, it can be actuated to retrieve a load from either a front location or a back location anywhere else in the aisle. The crane then travels back to the loading and unloading positions shown in FIG. 1; and the shuttle forks 60 run out to the left and set the load down in the crane dropoff position 62. Here the load travels by a conveyorized buffer over to the truck output position 66 which immediately frees an output storage location for another load to be brought out of the warehouse. From this truck output position, a conveyor can convey the pallet and load off to its designation, or a fork truck can be utilized to pick it up.

Let us assume, now that it is desired to retrieve a pallet and load which are in the back of a storage rack, and that another pallet and load are in front of the rack. The stacker crane 22 travels to the desired location; and the shuttle forks 60 are caused to run out and pick up the load that is in the front location. The load is then brought back to the platform 30. At this point, the carriage 69 is actuated to move the forks 72 into the spaces 73 under the pallet on the shuttle forks 60. The forks are then lifted and the carriage 69 moved backwardly into the position shown, for example, in FIG. 7. The shuttle forks 60 are now free to run to the back of the storage rack and retrieve the second load. After the second load is moved back onto the platform 30 by retraction of the shuttle forks 60, the stacker crane 22 is actuated to move both loads on the platform 30 back to the loading and unloading position shown in FIG. 1. Here, the shuttle forks 60 extend the load to the crane dropoff position 62. At this point, they can be extended to the right to pick up a pallet at the crane pickup position. After this new pallet and the load are positioned on the platform 30, the stacker crane 22 is actuated to position the platform 30 in front of a selected storage rack, whereupon the shuttle forks 60 are actuated to move the new pallet into the rack, either in the forward position of that rack or the rear position. Since the pallet and load just picked up comprise a new article to be stored in inventory, it will usually be preferable to store them in the back. Thereafter, carriage 69 can be actuated to move the pallet resting on its forks 72 back onto the the shuttle forks 60 which either move the pallet and load into the forward position of the rack just loaded or into another rack, depending upon requirements.

If desired, rollers 90 (FIG. 7) or other supports can be provided on the member 60D, for example, whereby it will be supported on the angle irons 42 as it moves outwardly. This, of course, will minimize the cantilevering effect on the shuttle fork mechanism, but means will have to be provided to elevate the last platform 60D after it is positioned under the pallet.

As will be appreciated, the entire system can be computerized in order to assign each load to a specific storage rack, either front or back, and then retrieved when required. Alternatively, the system could be operated manually.

Although the invention has been shown in connection with a certain specific embodiment, it will be readily apparent to those skilled in the art that various changes in form and arrangement of parts may be made to suit requirements without departing from the spirit and scope of the invention.

I claim:

1. In a warehousing system for storing and retrieving load bearing means, the combination of at least two high bay storage modules separated by an aisle, each of said modules comprising a honeycomb of storage racks arranged in superimposed and side-by-side relationship and extending along the length of said aisle on either side thereof, each of said racks being of a depth sufficient to store two load-bearing means one behind the other, overhead rails on either side of said aisle at the tops of said modules, a stacker crane movable on said rails and incorporating a platform vertically reciprocable in said aisle, horizontally extensible load-supporting means mounted on said platform extendable into any one of said racks on either side of said aisle and adapted to project under a load-bearing means stored either in the front or back of a storage rack and retrieve said load-bearing means onto said platform, and a horizontally movable carriage mounted on said platform below said extensible load-supporting means and having elevatable load support means adapted to project under a first load-bearing means retrieved by said extensible load-supporting means to move that load-bearing means off said extensible load-supporting means in a direction transverse to the direction of movement by said extensible load-supporting means to a position on said platform whereby said extensible load supporting means may extend under and retrieve a second load-bearing means and place said second load-bearing means on said platform adjacent said first load-bearing means.

2. The system of claim 1 wherein each of said racks comprises upright members having horizontally extending guideways secured thereto for supporting load bearing means for storage in said racks.

3. The system of claim 1 wherein said extensible load supporting means comprise a plurality of telescoping members which, when in their completely telescoped condition, have a width no greater than the width of said platform and when extended project outwardly and into an associated one of said racks.

4. The system of claim 1 wherein said elevatable load support means comprises horizontally extending fork means adapted for insertion under load bearing means having laterally spaced parallel horizontally elongated members extending downwardly from the load bearing means, said fork means being insertable between such elongated members.

5. The system of claim 4 wherein said carriage and fork means move parallel to said aisle.